FIG 2

Sept. 29, 1970 R. M. QUINN 3,531,629
RAPID READOUT WALL THICKNESS MEASURING APPARATUS
Filed Dec. 20, 1966 7 Sheets-Sheet 5

FIG 5

|   | A | B | C | D | E | F | G | H |
|---|---|---|---|---|---|---|---|---|
| 9 |   | X |   | X |   | X |   | X |
| 8 | X |   |   | X |   | X |   | X |
| 7 |   | X |   | X |   | X | X |   |
| 6 | X |   |   | X |   | X | X |   |
| 5 |   | X | X |   |   | X | X |   |
| 4 | X |   | X |   |   | X | X |   |
| 3 |   | X |   | X | X |   | X |   |
| 2 | X |   |   | X | X |   | X |   |
| 1 |   | X | X |   | X |   | X |   |
| 0 | X |   | X |   | X | X |   |   |

INVENTOR:
RICHARD M. QUINN

BY *Campbell & Harris*

ATTORNEYS

United States Patent Office 3,531,629
Patented Sept. 29, 1970

3,531,629
RAPID READOUT WALL THICKNESS MEASURING APPARATUS
Richard M. Quinn, Muncie, Ind., assignor to Ball Brothers Company Incorporated, Muncie, Ind., a corporation of Indiana
Filed Dec. 20, 1966, Ser. No. 603,212
Int. Cl. C03b; C03c; G06f 7/38; G06g 7/00
U.S. Cl. 235—92         3 Claims

ABSTRACT OF THE DISCLOSURE

This apparatus rapidly measures the thickness of the wall of a glass container through utilization of a binary counter to count pulses received from a radiation detector positioned at the side of a glass wall opposite to that of a radiation source, the binary counter producing a binary combination output which is translated to decimal form by decoders and a preselected decimal output from the decoders being utilized to cause an indication of the presence of a thin wall in the container under test.

---

This invention relates to a thickness measuring apparatus and more particularly to apparatus for rapidly measuring the thickness of the wall of a glass container.

It is oftentimes desirable to measure, or gauge, the thickness of material, and particularly the thickness of a wall of a glass container, or article. In making such a thickness determination, it is, of course, desirable that the wall remain unaltered to thereby preserve the usefulness of the article, and, in addition, it is also desirable that the thickness determination be rapidly made for substantially the entire wall, especially where it is desirable to test wall thickness of all articles on a line substantially concomitantly with formation of the same.

While inspection devices have been known and utilized heretofore, none of the previously known and/or utilized devices have proven to be completely successful especially where high-speed inspection is necessary, as is the case where all articles are to be inspected rather than merely a sampling as has been common heretofore. Some prior art devices have proven unsuccessful due to the type of detector or associated source while others have proven to be unsatisfactory for high-speed usage due to slow readout characteristics, such as, for example, where ratemeters or the like are utilized, which depend upon capacitor charge and discharge and thus make a slow rate of scan necessary in order for acceptable accuracy to be obtained.

It is therefore an object of this invention to provide an improved thickness gauge having rapid readout whereby the guage is usable at high speeds.

It is another object of this invention to provide an improved apparatus for measuring the thickness of a wall of a glass container having a rapid yet dependable readout.

It is still another object of this invention to provide an improved apparatus for quickly measuring the thickness of substantially the entire wall of a glass container whereby wall thickness of all containers on a line may be measured substantially concomitantly with formation.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the hereindisclosed invention are meant to be included as come within the scope of the claims.

The accompanying drawings illustrate one complete embodiment of the invention according to the best mode so far devised for the practical application of the principles thereof, and in which.

Referring now to the drawings, the wall 9 of a glass article, or container, to be measured for thickness is interposed between a radiation source 10 and radiation detector 11, both of which may be conventional. As is well known in the art, radiation source 10 may be, for example, a beta radiation source positioned so that the beta rays are directed through the wall 9 and are received at the opposite side by radiation detector 11. Radiation detector 11 includes, for example, a scintillation crystal which emits light particles to a photo-multiplier tube, which tube produces a pulse output in response to the light particles, all of which is well known in the art.

The pulse output from radiation detector 11 is coupled through conventional amplifier 13 to pulse shaper 14. Pulse shaper 14 may also be conventional and may be an amplitude discriminator which produces a pulse output of constant amplitude in response to incoming pulses above a predetermined threshold.

The pulse output from pulse shaper 14 is coupled to a counting and converting unit 16. It is the function of counting and converting unit 16 to count all pulses from pulse shaper 14 and provide an output in decimal form. Counting and converting unit 16 preferably includes three binary counters 17, 18, and 19, each of which produces a binary combination output usable by decoders 21, 23, and 25, respectively, to produce a decimal output based upon a 1–2–4–2 code.

Figure 1:
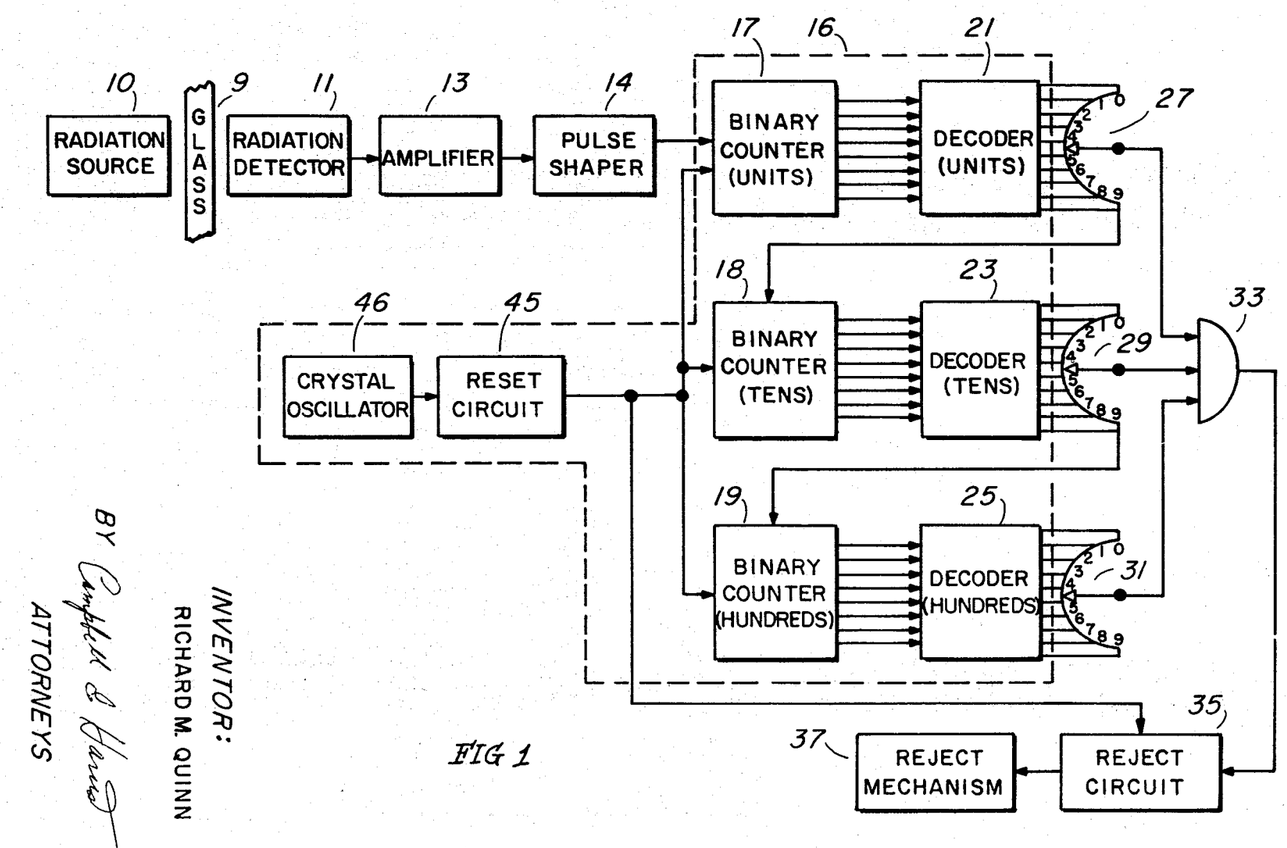
FIG. 1 is a block diagram of the apparatus of this invention.

As shown in FIG. 1, binary counter 17 receives the output pulses from pulse shaper 14 and counts the same. The binary combination produced by counter 17 is then coupled to decoder 21 where the combination is translated to decimal form. Since counter 17 and decoder 21 receive the output pulses from pulse shaper 14, decoder 21 operates as a units decoder. The highest decimal indication from units decoder 21 is coupled to binary counter 18 and counter 18 therefore receives one pulse for each cycle of the units decoder. The binary combination from binary counter 18 is then coupled to decoder 23, which therefore operates as a tens decoder. In like manner, the highest decimal output from decoder 23 is coupled to binary counter 19 and counter 19 therefore receives one pulse for each cycle of the tens decoder (or one pulse for each ten cycles of the units decoder). The binary combination from counter 19 is then coupled to decoder 25, which therefore operates a hundreds decoder.

The output from units decoder 21 is coupled to a selector switch 27 the wiper of which is engageable with any one of ten inputs having a decimal value of 0 to 9, as is conventional. In like manner, selector switches 29 end 31 are connected to receive the outputs of tens decoder 23 and hundreds decoder 25 to produce a selective 0 to 9 output from each switch.

The rotor, or wiper, of selector switches 27, 29, and 31 are connected to AND gate 33, which gate, in conjunction with the interrelationship between the sections of counting and converting unit 16, permits an output indication only of one decimal from 000 to 999.

Since the number of pulses from source 10 reaching detector 11 through any given glass wall is related to the thickness of that wall, selector switches 27, 29, and 31 can be preset to the minimum acceptable wall thickness (for this purpose a standard can be used if desired to determine the acceptable setting) and hence only when a wall below the minimum thickness will cause the number of counted pulses to exceed the preset number. If this occurs, an output is produced from AND gate 33 and coupled to reject circuit 35, which is preferably used to activate a conventional reject mechanism 37 to reject the article having a wall thickness less than the acceptable minimum thickness established by the selector switches 27, 29, and 31.

Figure 2:
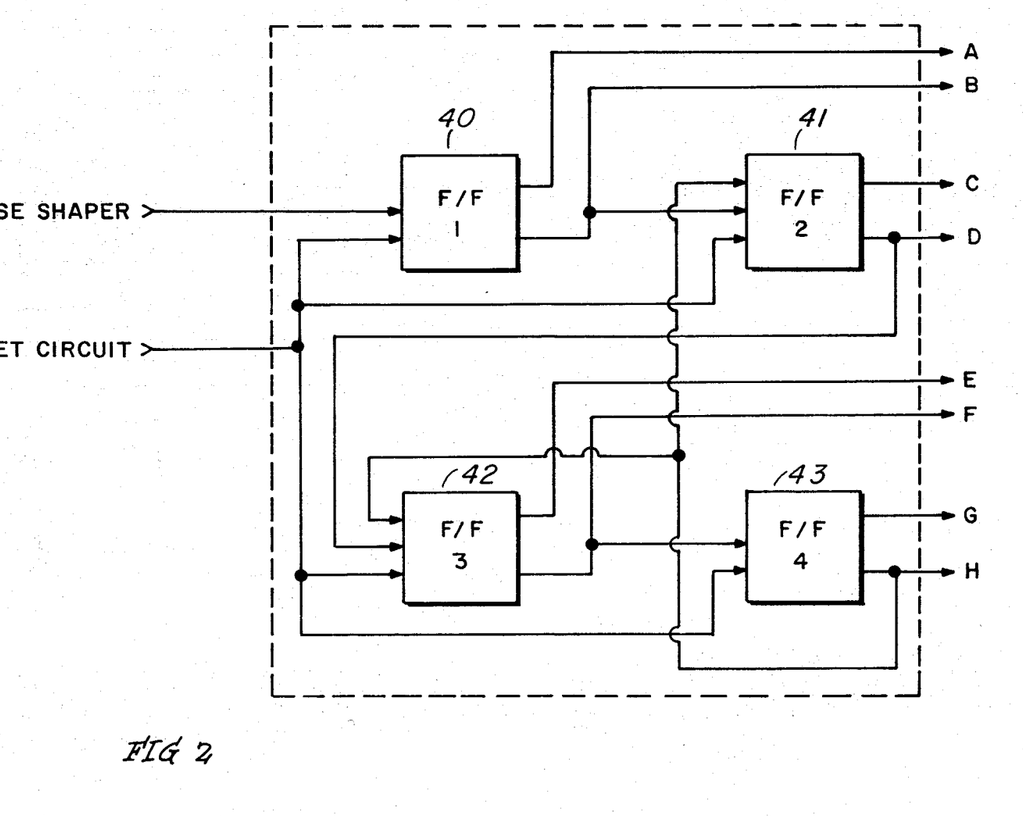
FIG. 2 is a block diagram illustrating in greater detail the counter shown in FIG. 1.

FIG. 2 illustrates the binary counters 17, 18, and 19 in more detail. As shown, each counter includes four bistable multivibrators, or flip-flops, 40, 41, 42, and 43 connected in series with one another. The output from pulse shaper 14 is coupled to the first flip-flop which has two outputs designated A and B which produce dissimilar outputs (1 or 0 representing an output or no output, respectively) as is conventional, a 1 appearing, of course, alternately at A and B as the state of the flip-flop is changed by each incoming pulse.

In addition, output B of flip-flop 40 is connected to the input of flip-flop 41 to cause this flip-flop to change states each time that a 1 appears at output B of flip-flop 40. Flip-flop 41 has two outputs designated as C and D and output D is connected to the input of flip-flop 42 to change the state of flip-flop 42 each time that a 1 appears at output D. In like manner, flip-flop 42 has two outputs designated E and F, and output F is connected to the input of flip-flop 43 to change the state of flip-flop 43 each time that a 1 appears at output F.

Flip-flop 43 has two outputs G and H and the output of flip-flop H is coupled to the input side of flip-flops 41 and 42 to cause both of these flip-flops to be set so that a 1 appears at C and E whenever a 1 appears at output H of flip-flop 43. This connection is necessary to modify the normal binary counter output from 1–2–4–8 to 1–2–4–2 so that continuous decimal decoding is achieved.

As shown in FIG. 1, the counting unit is reset by a reset circuit 45, which circuit is preferably controlled by a crystal oscillator 46. It has been found preferable to have a counting time of 0.001 second and a reset time of about 0.00001 second. With these times, high-speed performance has been achieved without adversely affecting accuracy. Crystal oscillator 46 may be conventional and may have the crystal temperature controlled for stability.

Figure 3:
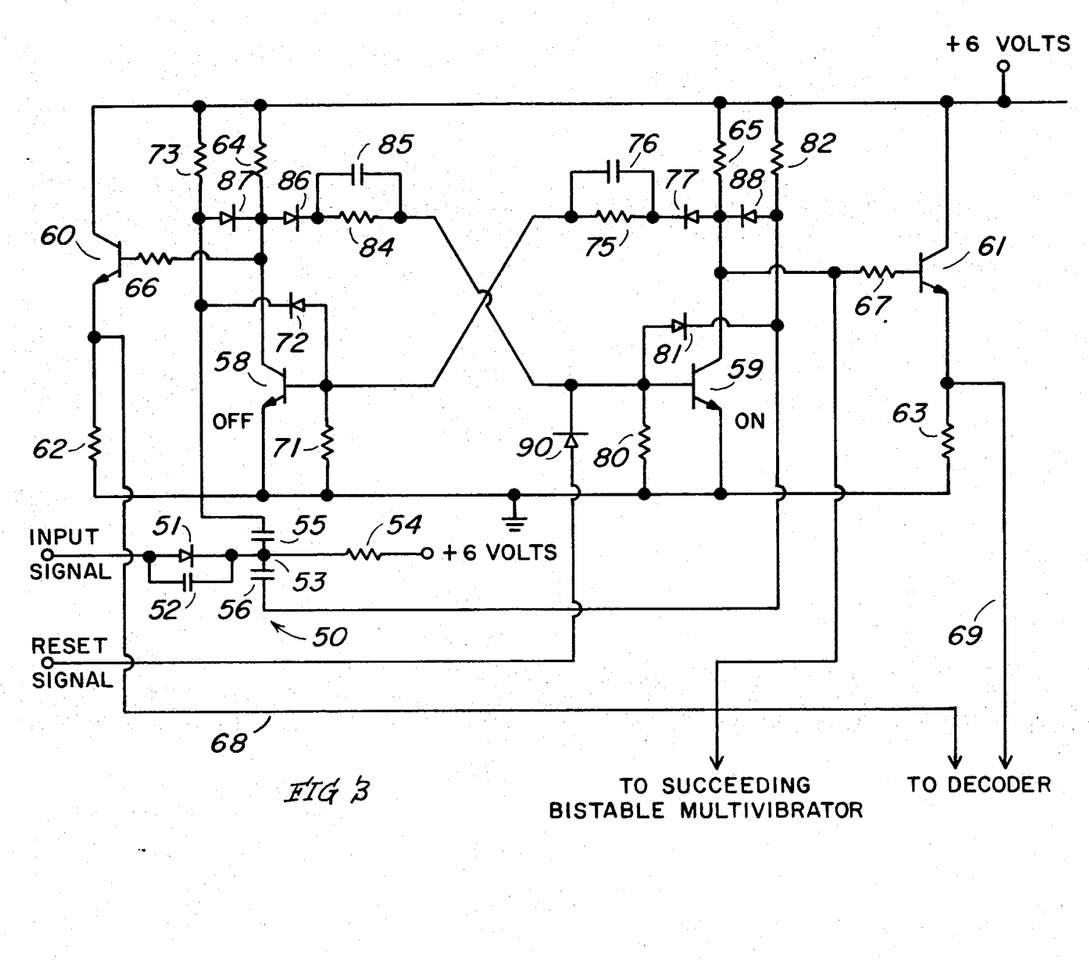
FIG. 3 is a schematic diagram of a bistable multivibrator shown in FIG. 2.

A bistable multivibrator suitable for use in the counting and converting unit is illustrated in FIG. 3. As shown, the input pulse is coupled to both sides of the multivibrator through a steering network 50, the input pulses being coupled through diode 51 and capacitor 52 connected in parallel with one another, and junction 53 of diode 51 and capacitor 52 being connected to a +6 volt power supply through resistor 54. Pulses appearing at junction 53 are coupled to opposite sides of the bistable multivibrator through capacitors 55 and 56.

The bistable multivibrator includes transistors 58 and 59 as well as drivers 60 and 61. The emitters of transistors 58 and 59 are directly connected to ground while the emitters of drivers 60 and 61 are connected to ground through resistors 62 and 63, respectively. The collector of drivers 60 and 61 are directly connected to the +6 volt power supply, while the collectors of transistors 58 and 59 are connected to the power supply through resistors 64 and 65, respectively. Drivers 60 and 61 are connected to the collectors of transistors 58 and 59 through resistors 66 and 67, respectively, with one output (A, C, E, and G of each counter) being taken from the emitter of driver 60 and through lead 68 and the other output (B, D, F, and H) from driver 61 being taken from the emitter through lead 69.

The base of transistor 58 is connected to ground through resistor 71 and is connected to capacitor 55 through diode 72, with the junction of capacitor 55 and diode 72 being connected to +6 volt power supply through resistor 73. In addition, the base of transistor 58 is connected to the collector of transistor 59 through resistor 75 and capacitor 76, connected in parallel with one another, and diode 77.

The base of transistor 59 is connected to ground through resistor 80 and to capacitor 56 through diode 81, the junction of diode 81 and capacitor 56 being connected to the +6 volt power supply through resistor 82. In addition, the base of transistor 59 is connected to the collector of transistor 58 through resistor 84 and capacitor 85, connected in parallel with one another, and diode 86.

A diode 87 is also connected between the junction of diode 72 and resistor 73, and the collector of transistor 58, while a like diode 88 is connected between the junction of diode 81 and resistor 82 and the collector of transistor 59. The reset pulse is coupled to the base of transistor 59 through diode 90 to reset transistor 59 to be conductive and transistor 58 to be nonconductive. The output from output H of flip-flop 43 is coupled to the input side of flip-flops 41 and 42, as indicated in FIG. 2, and more specifically is coupled to the input side opposite to that of the reset pulse shown in FIG. 3 so that transistor 58 would be conductive and transistor 59 nonconductive.

Figure 4:
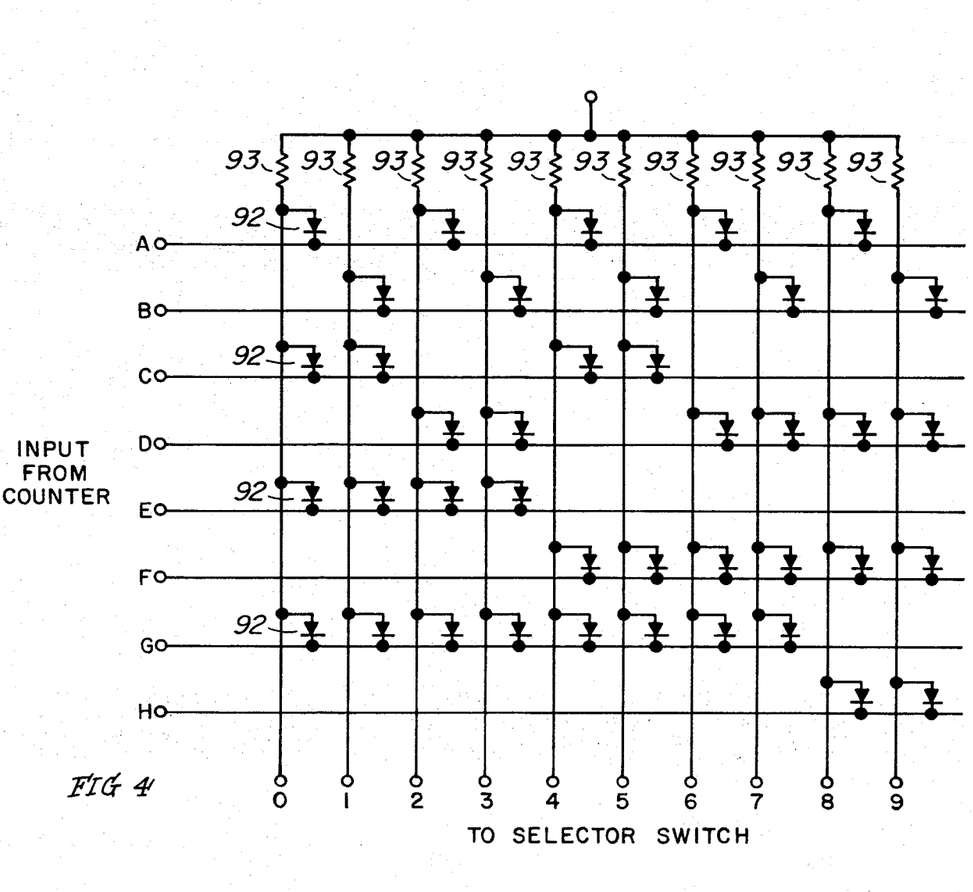
FIG. 4 is a schematic diagram of the decoder shown in FIG. 1.

As can be appreciated from the foregoing, the output from each counter will be a binary combination output so that an output will always be present at only four of the eight outputs designated A through H. The combination, of course, is predictable and hence can be translated by a decoder as shown in FIG. 4. As shown, the decoder includes a plurality of AND gates with the inputs from counters A through H being coupled to certain decimal output leads 0 to 9 through a predetermined diode pattern, there being four such connnections to each decimal output lead for translating the combination to decimal output.

Figure 5:
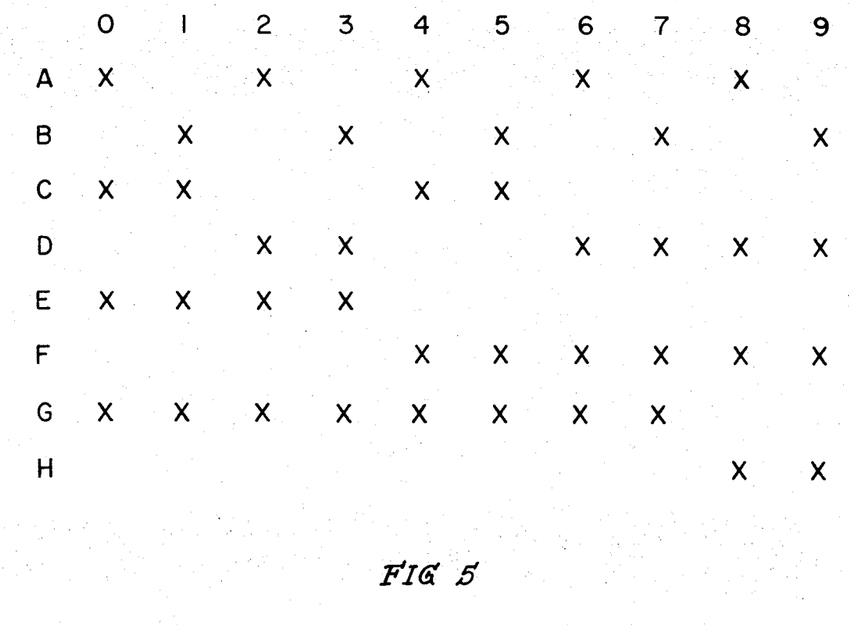
FIG. 5 illustrates the binary combination input and corresponding decimal output of the decoder shown in FIG. 5.

As shown in FIG. 5, the combination of outputs necessary to produce an output at any decimal lead is unique to that lead. For example, an output is produced at the 0 lead only when an output simultaneously appears at inputs A, C, E, and G since each of these inputs is connected by means of a diode, designated by the numeral 92, to lead 0. Power for the decoder is supplied to each decimal lead through a resistor designated by the numeral 93. In like manner, if an output appears on the B, D, F, and G inputs, an output pulse will appear on the numeral 6 output of the decoder.

Figure 6:
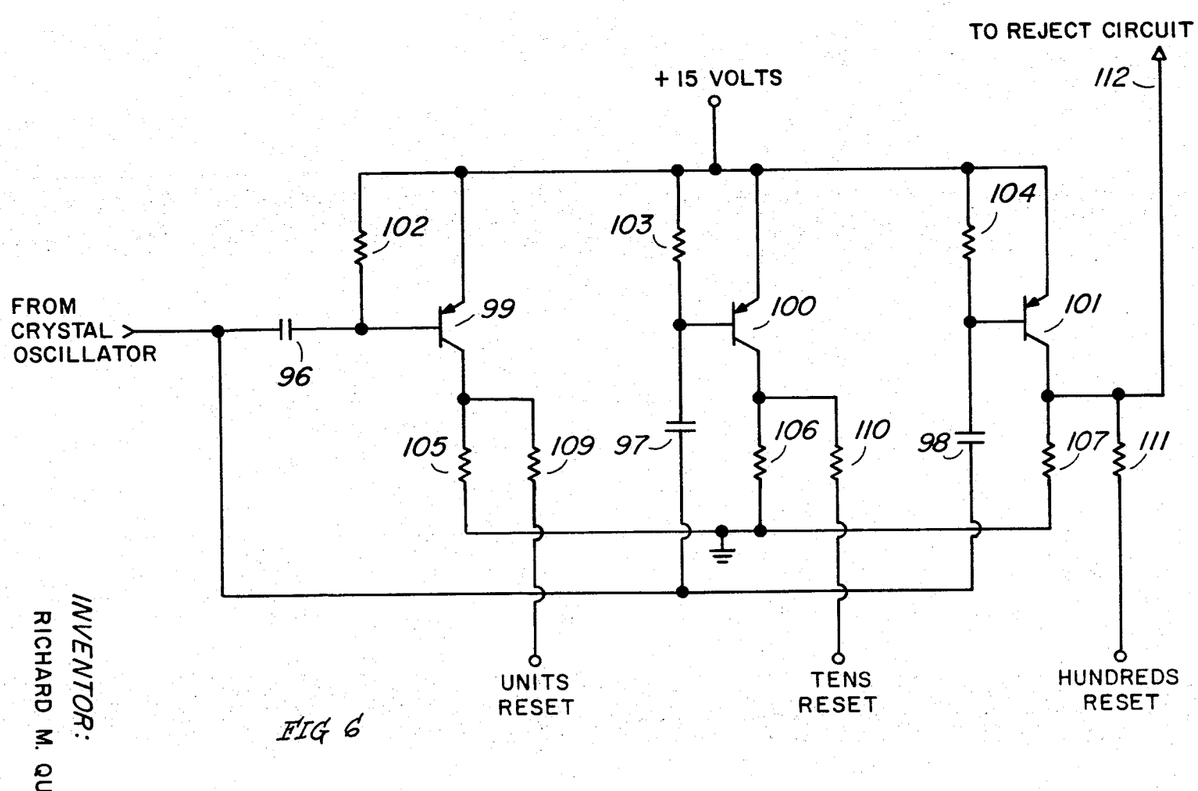
FIG. 6 is a schematic diagram of the reset circuit shown in FIG. 1.

The reset circuit is shown in schematic form in FIG. 6. As shown, an input from the oscillator is coupled through capacitors 96, 97, and 98 to the bases of transistors 99, 100, and 101, respectively. The emitters of the transistors are directly connected to the +15 volt power supply while the bases are connected to the power supply through resistors 102, 103, and 104, respectively. The collectors of transistors 99, 100, and 101 are connected to ground through resistors 105, 106, and 107, respectively, while the output from transistor 99 is taken from the collector through resistor 109, the output from transistor 100 is taken from the collector through resistor 110, and the output of transistor 101 is taken from the collector through resistor 111. An additional output is provided from the collector of transistor 101 through lead 112 to the reject circuit to blank the same during reset.

Figure 7:
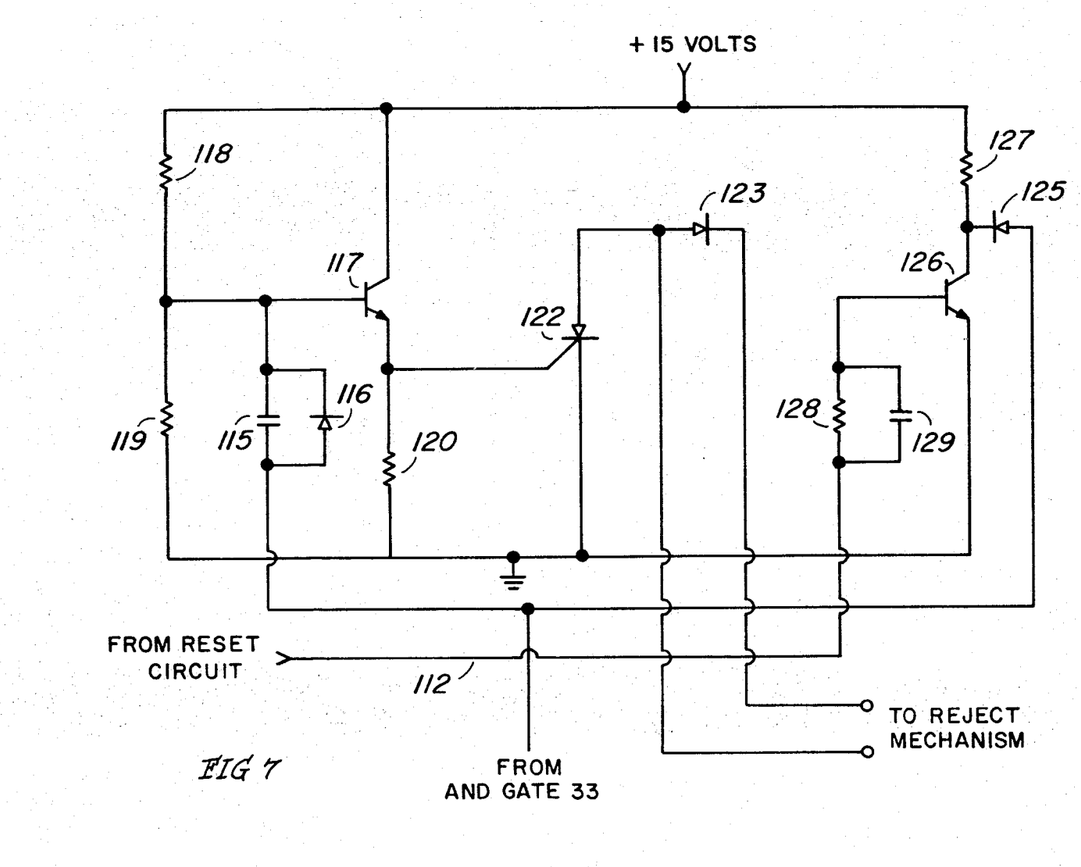
FIG. 7 is a schematic diagram of the reject circuit shown in FIG. 1.

Reject circuit 35 is shown in FIG. 7 and includes a reject trigger, an amplifier, and an INHIBIT gate. As shown in FIG. 7, an input from AND gate 33 is coupled through capacitor 115 and diode 116, connected in parallel with one another, to the base of transistor 117. The collector of transistor 117 is connected to the power supply directly while the base of transistor 117 is connected to the junction of resistors 118 and 119, which resistors form a voltage divider between the power supply and ground. The emitter of transistor 117 is connected to ground through resistor 120 and the output from transistor 117 is coupled to silicon control rectifier 122. The output to reject mechanism 37 is taken from opposite sides of a diode 123 which diode is connected to control rectifier 122.

The output from AND gate 33 is coupled through diode 125 to the collector of transistor 126 for inhibit purposes during reset. The collector of transistor 126 is connected through resistor 127 to the power supply, while the emitter is grounded. The base of transistor 126 is connected to receive the pulses from the reset circuit through lead 112 and resistor 128 and capacitor 129, connected in parallel with one another. Reject circuit 35 operates in response to an input from AND gate 33 to trigger the silicon controlled rectifier 122 and cause a reject indication and/or activation of a reject mechanism except during reset when the circuit in inhibited by the INHIBIT gate.

In operation and assuming that a glass container has been placed between the beta source and detector so that the detector receives radiation from the source after the radiation has passed through the container wall, the detector produces pulses the number of which is inversely proportional to wall thickness. These pulses, after passing pulse shaper 14, are coupled to the counting and converting unit where the pulses are counted by the binary counters and this count is then translated into decimal form by the decoders. By making a prior determination as to the desired thickness (preferably by reference to a standard) and setting the selector switches at a decimal number indicative of the minimum wall thickness allowable, the pulses will be counted for a predetermined period of time and if the number counted does not reach the predetermined number on the selector switches, the tested wall surface spot, or section, will be of acceptable thickness. Since the thickness determination is quickly made, the container can be in motion without affecting the readout of each spot, and hence by spiral scan the entire wall of the container is thus quickly tested. If any spot is too thin, the count will reach that number on the selector switches and the reject circuit will be energized to indicate the presence of the thin wall. Since testing is rapid, all containers on a line can be checked and hence the device is suitable for use in a glass plant to inspect all containers for thin walls without causing a delay in the container-forming operation.

From the foregoing, it can be seen that this apparatus produces an improved device for quickly inspecting glass containers for wall thickness and is well suited for use for inspection purposes on a glass container line.

What is claimed is:

1. Apparatus for measuring the thickness of an article, said apparatus comprising: a radiation source; a radiation detector for receiving radiation from said radiation source after said radiation has been directed toward a surface to be measured for thickness, said detector producing a pulse output with the number of said pulses being indicative of said thickness; a binary counting unit connected with said detector for counting the pulses received therefrom; selector means connected with said binary counting unit and producing an output only when a predetermined number of pulses have been counted by said unit; utilization means responsive to said output from said selector means for reject purposes; and a reset circuit controlled by an oscillator for resetting said binary counting unit at predetermined time intervals.

2. Apparatus for measuring the wall thickness of a glass container, said apparatus comprising: a radiation source; a radiation detector positioned such that radiation is received from said radiation source after said radiation passes through the wall of a glass container to be measured for thickness, said radiation detector producing a pulse output with the number of pulses being indicative of wall thickness; a first binary counter receiving pulses from said detector; a units decoder for translating the binary output of said first binary counter to decimal form; a second binary counter connected to said units decoder to receive a pulse therefrom at the end of each units cycle; a tens decoder for translating the binary output of said second binary counter to decimal form; a third binary counter connected to said tens decoder to receive a pulse therefrom at the end of each tens cycle; a hundreds decoder for translating the binary output of said third binary counter to decimal form; first, second and third selector switches connected to said units, tens, and hundreds decoders, respectively; an AND gate connected to said selector switches; a reject circuit connected to said AND gate and responsive to an output therefrom; and a reset circuit and crystal oscillator controlling said reset circuit whereby said binary counters are reset after a predetermined short interval of time.

3. Apparatus for rapidly measuring the wall thickness of a glass container, said apparatus comprising: a radiation source; a radiation detector positioned so that a wall of a glass container can be interposed therebetween, said detector producing a pulse output the number of which is indicative of wall thickness; a pulse shaper for producing pulses of constant amplitude in response to pulses received from said detector; a first binary counter receiving the pulse output from said pulse shaper and having four bistable multivibrators connected in series to produce a binary combination output; a units decoder having a plurality of AND gates for receiving said binary combination output from said first binary counter and producing a units decimal output; a second binary counter receiving a pulse from said units decoder at the end of each units cycle and having four bistable multivibrators connected in series to produce a binary combination output; a tens decoder having a plurality of AND gates for receiving said binary combination output from said second binary counter and producing a tens decimal output; a third binary counter receiving a pulse from said tens decoder at the end of each tens cycle and having four bistable multivibrators connected in series to produce a binary combination output; a hundreds decoder having a plurality of AND gates for receiving said binary combination output from said third binary counter and producing a hundreds decimal output; a units selector switch for selecting a units decimal number from said units decoder; a tens selector switch for selecting a tens decimal number from said tens decoder; a hundreds selector switch for selecting a hundreds decimal number from said hundreds decoder; an AND gate connected to said selector switches; a reject circuit connected to said AND gate; a reject mechanism for rejecting a container in response to an output from said reject circuit; and a crystal oscillator for repeatedly resetting said binary counters after short intervals of time whereby the thickness of substantially the entire wall of a container can be quickly sensed for thickness.

References Cited

UNITED STATES PATENTS

| | | | |
|---|---|---|---|
| 2,890,347 | 6/1959 | McCormick | 65—29 |
| 2,915,638 | 12/1959 | Poole | 65—158 |
| 3,180,994 | 4/1965 | Rottmann | 65—29 X |
| 3,226,562 | 12/1965 | Neitzert. | |
| 3,328,593 | 6/1967 | Johnson et al. | 65—158 X |
| 3,335,266 | 8/1967 | Somlyody. | |
| 3,359,406 | 12/1967 | Perry. | |
| 3,372,265 | 3/1968 | Gordon et al. | |
| 3,376,410 | 4/1968 | Lundin. | |
| 3,382,350 | 5/1968 | Yagusic | 235—92 |

DARYL W. COOK, Primary Examiner

R. M. KILGORE, Assistant Examiner

U.S. Cl. X.R.

65—29